UNITED STATES PATENT OFFICE.

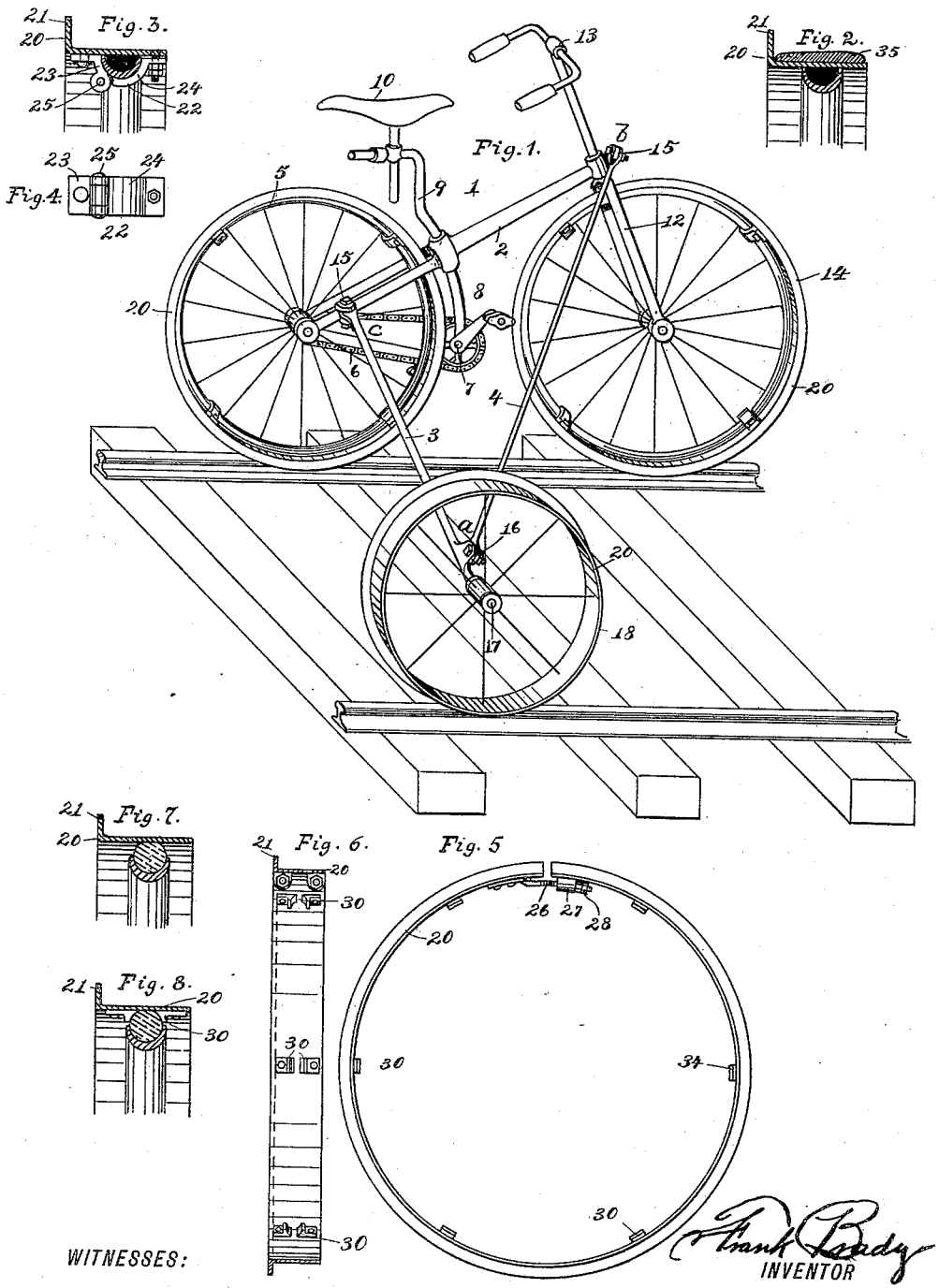

FRANK BRADY, OF DENVER, COLORADO.

TIRE FOR RAILWAY-TRICYCLES.

SPECIFICATION forming part of Letters Patent No. 427,663, dated May 13, 1890.

Application filed August 9, 1889. Serial No. 320,304. (No model.)

*To all whom it may concern:*

Be it known that I, FRANK BRADY, a citizen of the United States, residing at Denver, in the State of Colorado, have invented certain new and useful Improvements in Railway-Tricycles and Tires therefor; and I do hereby declare that the following is a full, clear, and exact description of the same, such as will enable others skilled in the art to which it appertains to make and use the same.

My present invention relates to that class of tricycles especially adapted for rapid transportation by manual power on a railway-track; and the objects of my invention are, first, to provide an improved tricycle which is adapted to move around curves and over switches and other parts of a track without danger of being derailed or displaced from the track when traveling very rapidly; second, to adapt an ordinary land-bicycle of the "Safety" pattern to be converted and used with a few additions of parts as a railway-tricycle, and, finally, to provide an improved metallic tire adapted to travel and retain its place on the head of a rail, which tire can be easily and readily applied to a wheel when worn or injured, and which is not liable to become displaced or loose on the wheel.

My invention contemplates an attachment for an ordinary tricycle-wheel, which consists of a metallic rim or band having a smooth flat periphery or tread and a right-angled flange at one edge thereof. This rim or band is adapted to travel or ride on the head of the rail, and its flange rides against the inner side of said rail-head to prevent displacement of the rim. The rim or band is held against lateral displacement on the periphery of the tricycle-wheel by means of sockets or clamps which are arranged or located on the inner face of the rim and fit over or around the felly of the wheel. In case the flanged metallic rim or band is made in one continuous piece, I prefer to provide sectional hinged clamps for holding the rim or band on the felly of the wheel; but when the band or rim is made in the form of a draw-band and is provided with a threaded bolt, which is attached to one end of the flanged rim or band and is adapted to be moved by a nut to tighten said rim or band on the wheel, I provide open metallic sockets on the inner face of the flanged rim or band which receive the felly of the wheel. By this construction of parts the flanged rim or wheel is securely held upon the felly of the tricycle-wheel without being bolted or riveted directly thereto, which enables the rim or band to be expeditiously removed.

To enable others to more readily understand my invention, I will now proceed to a detailed description thereof, in connection with the accompanying drawings, forming a part of this specification, and in which—

Figure 1 is a perspective view of my improved railway-tricycle. Fig. 2 is a vertical transverse sectional view through the felly of one of the wheels and my improved flanged rim or band. Fig. 3 is a view corresponding to Fig. 2, showing a sectional clamp or socket; and Fig. 4 is a detached plan view of the socket. Fig. 5 is a side elevation of the flanged rim or band constructed as a draw-band detached from the wheel. Fig. 6 is a transverse sectional view through Fig. 5. Figs. 7 and 8 are detail transverse sectional views through the draw-band or rim fitted on the felly of a wheel.

Like numerals of reference denote corresponding parts in all the figures of the drawings, referring to which—

1 designates the frame of the tricycle, which consists of the forked main bar 2, a horizontal rod 3, which is jointed to the main bar near its rear end and extends outwardly at substantially right angles therefrom, and an inclined rod 4, which is jointed at one end to the horizontal rod 3 and at its other end to the front end of the main forked bar 2. This main bar has a rear driving-wheel 5 journaled in its rear forked end, and this wheel is driven by a sprocket-chain 6, which passes over a crank-shaft 7, said shaft being journaled in a depending arm 8 on the main bar. This main bar also carries a seat-standard 9 and a seat 10 for the rider, and in the front end of the bar is fitted a steering-fork 12, having a handle or head 13 and a steering-wheel 14.

The horizontal rods 3 4 are connected to the main forked bar 2 near the ends of the latter by means of horizontal hinge-joints 15, through which are passed vertical pivot-bolts, and the other ends of said bars are connected together by a similar joint 16, said joints providing for the necessary play or flexibility to the frame of the machine to enable it to round curves when in motion. The outer end of the horizontal rod 3 is formed into a spindle 17, on which is fitted a third wheel 18, the latter wheel being adapted to travel on one rail of a railway-track, while the driving and steering wheels are adapted to travel on the other rail of said track.

Each wheel of the machine—namely, the driving, steering, and small wheel, 5, 14, and 18, respectively—is provided with my improved flanged metallic rim or band 20, one form of which I have shown in Fig. 2. This rim or band may be applied directly against the metallic felly of the wheel, as indicated in Fig. 2, in which event it is secured in place thereon in any suitable manner, and said rim has a broad tread or periphery and a right-angled flange 21 at one edge thereof, the flange being integral with the rim, as shown. The flanges on the rims of the steering, driving, and smaller wheels are arranged to travel on the inner side of the heads of the rails constituting the track to prevent derailment of the machine.

In Figs. 3 and 4 of the drawings I have shown one form of socket or clamp for holding the rim or band in position on the wheel without directly uniting the parts together. A series or number of these clamps are provided, and they are located at suitable intervals around the wheel to hold the band or rim securely thereon; but I have only deemed it necessary to show one of the clamps as an embodiment of this form of my invention.

The clamp or socket 22 is made in two parts or members 23 24, which are united or hinged together, as at 25, and one member of the clamp is permanently united to the rim, as by rivets, while the other member is detachably secured to the rim by a threaded stem or bolt and a nut or nuts, as clearly shown in Fig. 3. This socket or clamp is arranged within the rim or band on the inner face thereof, and it is fitted beneath or around the felly of the wheel, whereby the rim is securely held in position on the wheel against lateral displacement, and the rim can be easily removed from the wheel or applied thereto, as may be desired.

The rim or band may be constructed as a draw or expansible band adapted to be drawn tightly around and upon the elastic tire of the wheel, as in Figs. 5 to 8, inclusive. As indicated in Fig. 5, a bolt 26 is rigidly united to one end of the band or rim—as, for instance, by riveting or otherwise—and the other end of this bolt passes through an aperture in a fixed lug 27 on the other end of the draw band or rim, a nut 28 being fitted on the bolt. By means of this draw-bolt and nut the band or rim can be securely and tightly drawn upon the felly of a wheel. In some instances this expansible or draw band may be fitted on the elastic tire of a wheel and drawn so tightly around the tire as to hold itself in place without the use of a socket or clamp, as by compressing the tire and by frictional contact between the tire and rim, as indicated in Fig. 7; but I prefer to provide the draw or expansible band with open sockets 30, which are fixed on the inner face of the rim or band at suitable intervals (see Figs. 5, 6, and 8) and fit transversely over the elastic tire or the felly of the wheel.

In order to decrease the noise of the metallic rim or band when in motion on the metallic rails and to insure an easy motion, I provide the metallic rim with an elastic tire 35, which is fitted snugly on the periphery or tread of the rim or band below or within the edge of the right-angled flange thereof and is securely united to the rim.

The operation and advantages of my invention will be readily understood and appreciated by those skilled in the art to which it relates from the foregoing description, taken in connection with the drawings.

It is evident that slight changes in the form and proportion of parts can be made without departing from the spirit of my invention.

I do not in this application lay claim to the particular construction of the frame or running-gear herein shown and described, as the same forms the subject-matter of a separate application.

Having thus fully described my invention, what I claim as new, and desire to secure by Letters Patent, is—

1. An attachment for the wheels of tricycles and the like, consisting of a metallic rim or band having at one edge a right-angled flange which projects beyond the plane of the tread or face of said rim or band, and sockets or clamps arranged on the inner face of the band transversely across the same to hold the band on the felly of a wheel against lateral displacement, substantially as described.

2. An attachment for the wheels of tricycles and the like, consisting of a metallic rim or band having an integral right-angled flange at one edge, and a series of clamps or sockets arranged on the inner face of the band transversely across the same, each clamp or socket consisting of two flexibly-jointed parts or members, for the purpose described, substantially as set forth.

3. An attachment for the wheels of tricycles and the like, consisting of a metallic expansible or draw band or rim having a right-angled flange which projects beyond the plane of the tread or face of said rim or band, and a draw-bolt united to one end of the band or rim and attached adjustably to the other end of said rim or band, whereby the band or rim may be tightened on the periphery or felly of a wheel, substantially as described.

4. An attachment for the wheels of tricycles and the like, consisting of a metallic expansible band or rim having a right-angled flange which projects beyond the plane of the tread or face of said rim or band, and a draw-bolt, and a series of sockets arranged at intervals on the inner face of the band transversely across the same, substantially as described.

FRANK BRADY.

Witnesses:
J. M. ABBOTT,
D. MCPHERSON.